(12) United States Patent
Xu et al.

(10) Patent No.: US 12,374,900 B2
(45) Date of Patent: Jul. 29, 2025

(54) WIND POWER ACCOMMODATION ORIENTED LOW-CARBON OPERATION SCHEDULING METHOD FOR OFFSHORE OIL AND GAS PLATFORM ENERGY SYSTEM

(71) Applicant: Tianjin University, Tianjin (CN)

(72) Inventors: Xiandong Xu, Tianjin (CN); Jing Liu, Tianjin (CN); Hongjie Jia, Tianjin (CN)

(73) Assignee: Tianjin University, Tianjin (CN)

( * ) Notice: Subject to any disclaimer, the term of this patent is extended or adjusted under 35 U.S.C. 154(b) by 459 days.

(21) Appl. No.: 18/152,274

(22) Filed: Jan. 10, 2023

(65) Prior Publication Data

US 2023/0361576 A1 Nov. 9, 2023

(30) Foreign Application Priority Data

May 6, 2022 (CN) .......................... 202210483424.2

(51) Int. Cl.
*H02J 3/46* (2006.01)
*H02J 3/00* (2006.01)
*H02J 3/38* (2006.01)

(52) U.S. Cl.
CPC ............ *H02J 3/466* (2020.01); *H02J 3/0075* (2020.01); *H02J 3/381* (2013.01);
(Continued)

(58) Field of Classification Search
CPC .......... H02J 3/466; H02J 3/0075; H02J 3/381; H02J 2203/10; H02J 2203/20;
(Continued)

(56) References Cited

U.S. PATENT DOCUMENTS

| | | | |
|---|---|---|---|
| 11,399,065 B1 * | 7/2022 | Thirumurthy | H02J 13/00004 |
| 11,703,032 B2 * | 7/2023 | Xia | G06Q 50/06 |
| | | | 290/44 |

(Continued)

FOREIGN PATENT DOCUMENTS

| | | |
|---|---|---|
| CN | 110210747 A | 9/2019 |
| CN | 110429649 A | 11/2019 |

(Continued)

OTHER PUBLICATIONS

CN-114548844-B (Jul. 8, 2022) machine translation.*

(Continued)

*Primary Examiner* — M. N. Von Buhr
(74) *Attorney, Agent, or Firm* — Maier & Maier, PLLC

(57) ABSTRACT

A wind power accommodation oriented low-carbon operation scheduling method for offshore oil and gas platform energy system. Aiming at uncertainty and fluctuation of wind power, the method constructs a target linear planning model. A target function result of the model is the lowest power synthesis of a gas generator. Constraints of the model include a gas power generation and wind power synergetic ramp flexibility constraint, a gas generating capacity and wind power capacity synergetic flexibility constraint, an operating characteristic constraint of a gas generator set, an operating characteristic constraint of a gas compressor and a grid-connected operating characteristic constraint of a wind generator. The scheduling method can effectively cope with the uncertainty and fluctuation of wind power, so as to reduce carbon emission of the energy system of the offshore oil and gas field.

9 Claims, 5 Drawing Sheets

(52) U.S. Cl.
CPC ....... *H02J 2203/10* (2020.01); *H02J 2203/20* (2020.01); *H02J 2300/28* (2020.01)

(58) Field of Classification Search
CPC . H02J 2300/28; Y02E 10/76; G06Q 1/06312; G06Q 50/06
See application file for complete search history.

(56) References Cited

U.S. PATENT DOCUMENTS

| | | | |
|---|---|---|---|
| 2020/0301384 A1* | 9/2020 | Chiang | H02J 3/0075 |
| 2020/0310369 A1* | 10/2020 | Raghunathan | H02J 3/466 |

FOREIGN PATENT DOCUMENTS

| | | | | |
|---|---|---|---|---|
| CN | 110492534 A | 11/2019 | | |
| CN | 111525628 A | 8/2020 | | |
| CN | 113870054 A | 12/2021 | | |
| CN | 114139349 A | 3/2022 | | |
| CN | 114548844 B | * 7/2022 | ............. | G06Q 50/06 |
| CN | 114583766 B | 7/2022 | | |

OTHER PUBLICATIONS

Zhou Yang et al., "Low Carbon Economic Dispatching of Electric-Gas Interconnection Integrated Energy Source System Considering Carbon Capture Equipment", Electrical & Energy Management Technology, 2020, No. 4, 7 pgs.

Mu Mingliang et al., "Optimal Scheduling of CCHP Microgrid Considering Flexibility", New Energy, 2020, vol. 48, No. 3, 9 pgs.

Gong Xiaoqin et al., "Low-carbon economic operation for integrated electricity and natural-gas energy system with power-to-gas", Journal of Electric Power Science and Technology, Mar. 2020, vol. 35, No. 2, 8 pgs.

Chinese Office Action issued on Jun. 13, 2022 in corresponding application No. 202210483424.2; 6 pgs.

* cited by examiner

WIND POWER ACCOMMODATION ORIENTED LOW-CARBON OPERATION SCHEDULING METHOD FOR OFFSHORE OIL AND GAS PLATFORM ENERGY SYSTEM

CROSS-REFERENCE TO RELATED APPLICATION

The present application claims the priority of Chinese patent application no. 202210483424.2, filed on May 6, 2022, the entire contents of all of which are incorporated herein by reference.

FIELD

The present application relates to the technical field of new energy resources and particularly relates to a wind power accommodation oriented low-carbon operation scheduling method for offshore oil and gas platform energy system.

BACKGROUND

Power consumption of the offshore oil and gas platform is usually provided by gas generators on the platform. These devices feature high operating and maintenance costs and will discharge a lot of carbon dioxide and nitrogen oxide, which is quite harmful for the completion of a carbon emission reduction target in the offshore oil and gas industry. At present, with the rapid development of offshore wind power, operators integrate deep sea oil and gas platforms with offshore wind power for parallel operation with gas generators so as to form a power system of the isolated offshore oil and gas field, which on the one hand, can save the fuel cost, and on the other hand, can further assist carbon emission reduction in the offshore oil and gas industry.

Although the lower the powers of the gas generators are, the lower the carbon emission naturally is, different from a conventional power distribution network or microgrid, the offshore oil and gas platform has induction electric motors with maximum powers and very high demand on reactive power, and the power grid of the offshore platform closely interacts with a natural gas pipe network by virtue of the gas generators and compressors. Moreover, wind power is of uncertainty and fluctuation. When wind power and the power grid of the offshore oil and gas field are networked, the gas generators play another role in smoothing the imbalance of power supply and demand. Intermittent behaviors of wind power are transferred to a gas system and induce fluctuation of the pressure of gas dependent on change of wind power output. Therefore, electric comprehensive energy low-carbon operation of the offshore oil and gas platform needs to consider normal operation of a power system and fluctuation of wind power. In the prior art, there is no low-carbon operation scheduling method for an electric comprehensive energy system of the offshore oil and gas platform capable of effectively coping with randomness and fluctuation of wind power.

Therefore, it is needed to improve and enhance the prior art.

SUMMARY

Aiming at the above defects in the prior art, the present application provides a wind power accommodation oriented low-carbon operation scheduling method for offshore oil and gas platform energy system, so as to solve the problem that there is no low-carbon operation scheduling method for an electric comprehensive energy system of the offshore oil and gas platform capable of effectively coping with randomness and fluctuation of wind power.

In order to solve the above technical problem, the present application adopts a technical scheme as follows:

In the first aspect, the present application provides a wind power accommodation oriented low-carbon operation scheduling method for offshore oil and gas platform energy system, including:

determining the maximum upward ramp flexibility demand and the maximum downward ramp flexibility demand caused by wind power in a target power grid system according to a predetermined scheduling period, and establishing a gas power generation and wind power synergetic ramp flexibility constraint according to an upward ramp ability, a downward ramp ability, the maximum upward ramp flexibility demand and the maximum downward ramp flexibility demand of a gas generator started in the target power grid system;

establishing a gas generating capacity and wind power capacity synergetic flexibility constraint according to a rated capacity of the started gas generator connected to each bus in the target power grid system;

establishing an operating characteristic constraint of a gas generator set according to an output power factor of the started gas generator set connected to each bus in the target power grid system, and establishing an operating characteristic constraint of a gas compressor according to operating parameters of each started gas compressor in the target power grid system;

establishing a grid-connected operating characteristic constraint of a wind generator according to a power factor of the wind generator connected to each bus in the target power grid system;

constructing a target linear planning model, wherein constraints of the target linear planning model include the gas power generation and wind power synergetic ramp flexibility constraint, the gas generating capacity and wind power capacity synergetic flexibility constraint, the operating characteristic constraint of the gas generator set, the operating characteristic constraint of the gas compressor and the grid-connected operating characteristic constraint of the wind generator; a target function of the target linear planning model is $$\min \sum_{i \in N^e} \sum_{\kappa \in \Omega^e_{E,i}} P^E_{i,\kappa},$$

wherein $P^E_{i,\kappa}$ is an active power of the gas generator $\kappa$ connected to a bus i in the target power grid system, $N^e$ is a set of the buses in the target power grid system, and $\Omega^e_{E,i}$ is a set of the started gas generators connected to the bus i in the target power grid system; and solving the target linear planning model to obtain target powers of the started gas generators in the target power grid system, and performing scheduling according to the target powers, so that the powers of the started gas generators in the target power grid system reach the corresponding target powers.

In the second aspect, the present application provides a wind power accommodation oriented low-carbon operation scheduling system for offshore oil and gas platform energy system, operated on a terminal, the terminal includes: a processor and a computer readable storage medium in communication connection with the processor, the processor including:

- a first constraint module, configured to determine the maximum upward ramp flexibility demand and the maximum downward ramp flexibility demand caused by wind power in a target power grid system according to a predetermined scheduling period, and to establish a gas power generation and wind power synergetic ramp flexibility constraint according to an upward ramp ability, a downward ramp ability, the maximum upward ramp flexibility demand and the maximum downward ramp flexibility demand of a gas generator started in the target power grid system;
- a second constraint module, configured to establish a gas generating capacity and wind power capacity synergetic flexibility constraint according to a rated capacity of the started gas generator connected to each bus in the target power grid system;
- a third constraint module, configured to establish an operating characteristic constraint of a gas generator set according to an output power factor of the started gas generator set connected to each bus in the target power grid system, and to establish an operating characteristic constraint of a gas compressor according to operating parameters of each started gas compressor in the target power grid system;
- a fourth constraint module, configured to establish a grid-connected operating characteristic constraint of a wind generator according to a power factor of the wind generator connected to each bus in the target power grid system;
- a model constructing module, configured to construct a target linear planning model, wherein constraints of the target linear planning model include the gas power generation and wind power synergetic ramp flexibility constraint, the gas generating capacity and wind power capacity synergetic flexibility constraint, the operating characteristic constraint of the gas generator set, the operating characteristic constraint of the gas compressor and the grid-connected operating characteristic constraint of the wind generator; a target function of the target linear planning model is $$\min \sum_{i \in N^e} \sum_{\kappa \in \Omega_{E,i}^e} P_{i,\kappa}^E,$$

wherein $P_{i,\kappa}^E$ is an active power of the gas generator $\kappa$ connected to a bus i in the target power grid system, $N^e$ is a set of the buses in the target power grid system, and $\Omega_{E,i}^e$ is a set of the started gas generators connected to the bus i in the target power grid system; and

- a model solving module, configured to solve the target linear planning model to obtain target powers of the started gas generators in the target power grid system, and to perform scheduling according to the target powers, so that the powers of the started gas generators in the target power grid system reach the corresponding target powers.

In the third aspect, the present application provides a terminal, including a processor and a storage medium in communication connection with the processor. The storage medium is adapted to store a plurality of instructions, and the processor is adapted to transfer the instructions in the storage medium to execute the steps that implement any one of the above wind power accommodation oriented low-carbon operation scheduling method for offshore oil and gas platform energy system.

In the fourth aspect, the present application provides a computer readable storage medium having one or more programs stored thereon, the one or more programs capable of being executed by one or more processors to implement the steps of any one of the above wind power accommodation oriented low-carbon operation scheduling method for offshore oil and gas platform energy system.

Compared with the prior art, the present application provides a wind power accommodation oriented low-carbon operation scheduling method for offshore oil and gas platform energy system. Aiming uncertainty and fluctuation of wind power, the wind power accommodation oriented low-carbon operation scheduling method for offshore oil and gas platform energy system constructs the target linear planning model. The target function result of the model is the lowest power synthesis of the gas generator. Constraints of the model include the gas power generation and wind power synergetic ramp flexibility constraint, the gas generating capacity and wind power capacity synergetic flexibility constraint, the operating characteristic constraint of the gas generator set, the operating characteristic constraint of the gas compressor and the grid-connected operating characteristic constraint of the wind generator. The gas power generation and wind power synergetic ramp flexibility constraint is constructed according to the maximum upward and downward ramp demand of wind power and the ramp ability of the gas generator within the scheduling period, thereby guaranteeing that the finally calculated wind power bearing capacity can satisfy the condition that wind power ramp would not affect flexible and safe operation of the power grid system within the scheduling period. The gas generating capacity and wind power capacity synergetic flexibility constraint is established according to the rated power of the gas generator in the power grid system, thereby guaranteeing that the gas generator in the power grid system has certain adequacy due to the finally calculated wind power bearing capacity. The operating characteristic constraint of the gas generator set, the operating characteristic constraint of the gas compressor and the grid-connected operating characteristic constraint of the wind generator can guarantee that the calculated wind power bearing capacity can satisfy the operating characteristics of the wind generator set, the gas generator and the gas compressor. The scheduling method provided by the present application can effectively cope with uncertainty and fluctuation of wind power to schedule the power of the gas generator in the system in the operating process of the power grid system of the offshore oil and gas field, so as to reduce carbon emission of the energy system of the offshore oil and gas field.

DETAILED DESCRIPTION OF THE EMBODIMENTS

In order to make objectives, technical solutions and advantages of the prevent application clearer, the prevent application will be further described in detail below in combination with drawings and embodiments. It is to be understood that the specific embodiments described herein are merely used for explaining the present application rather than limiting the present application.

Embodiment I

The low-carbon operation scheduling method for an energy system of a wind power accommodation oriented offshore oil and gas platform provided by the present application can be applied to a terminal. The terminal can schedule the power of the gas generator in the power grid in the operating process of the energy system of the offshore oil and gas platform by means of the low-carbon operation scheduling method for an energy system of a wind power accommodation oriented offshore oil and gas platform provided by the present application, so as to reduce carbon emission in the operating process of the energy system of the offshore oil and gas platform.

Figure 1:
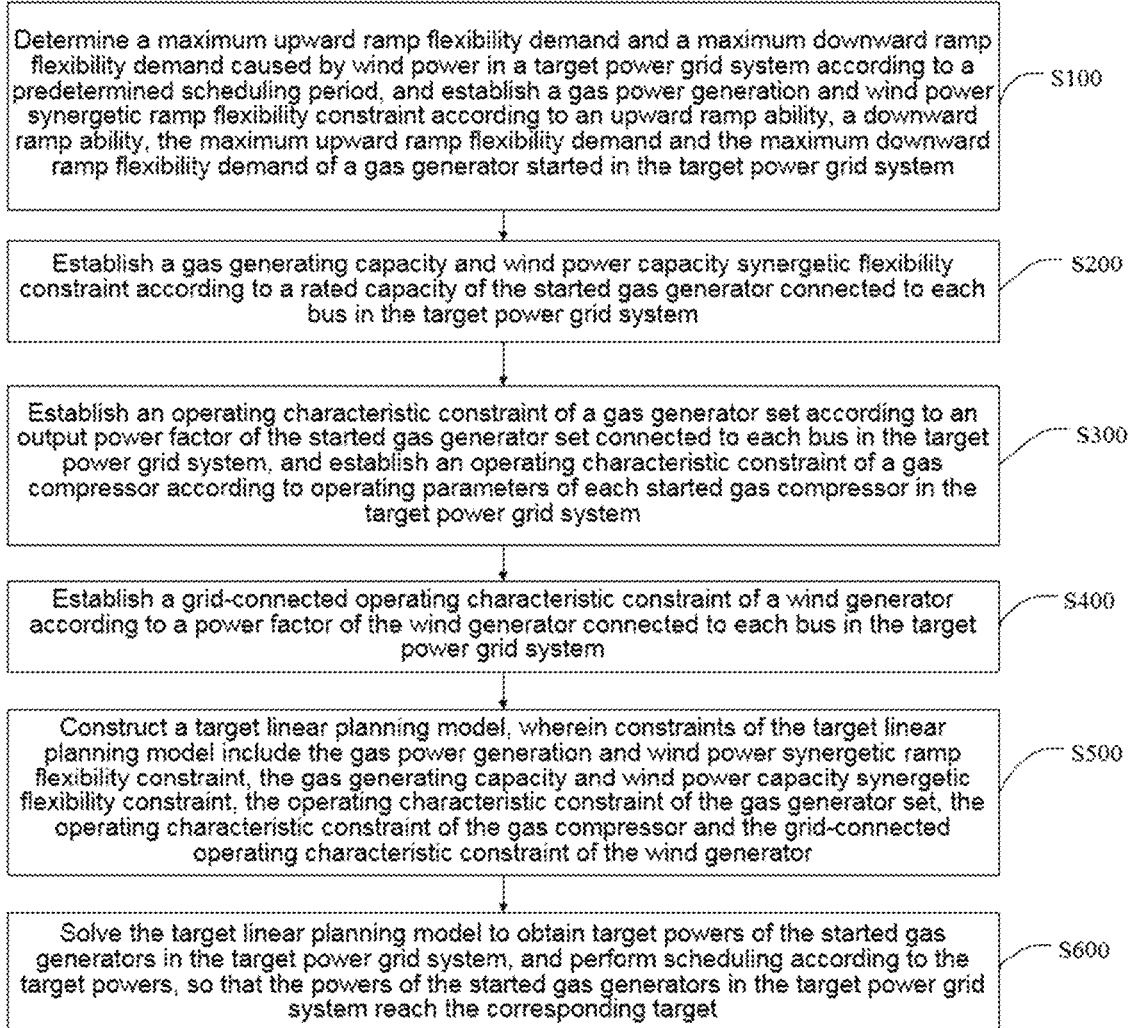
FIG. 1 is a flowchart of an embodiment of a wind power accommodation oriented low-carbon operation scheduling method for offshore oil and gas platform energy system provided by the present application.

As shown in FIG. 1, in an embodiment of the wind power accommodation oriented low-carbon operation scheduling method for offshore oil and gas platform energy system, the method includes the following steps:

S100: the maximum upward ramp flexibility demand and the maximum downward ramp flexibility demand caused by wind power in a target power grid system are determined according to a predetermined scheduling period, and a gas power generation and wind power synergetic ramp flexibility constraint is established according to an upward ramp ability, a downward ramp ability, the maximum upward ramp flexibility demand and the maximum downward ramp flexibility demand of a gas generator started in the target power grid system;

S200: a gas generating capacity and wind power capacity synergetic flexibility constraint is established according to a rated capacity of the started gas generator connected to each bus in the target power grid system;

S300: an operating characteristic constraint of a gas generator set is established according to an output power factor of the started gas generator set connected to each bus in the target power grid system, and an operating characteristic constraint of a gas compressor is established according to operating parameters of each started gas compressor in the target power grid system;

S400: a grid-connected operating characteristic constraint of a wind generator is established according to a power factor of the wind generator connected to each bus in the target power grid system;

S500: a target linear planning model is constructed, wherein constraints of the target linear planning model include the gas power generation and wind power synergetic ramp flexibility constraint, the gas generating capacity and wind power capacity synergetic flexibility constraint, the operating characteristic constraint of the gas generator set, the operating characteristic constraint of the gas compressor and the grid-connected operating characteristic constraint of the wind generator; a target function of the target linear planning model is $$\min \sum_{i \in N^e} \sum_{\kappa \in \Omega^e_{E,i}} P^E_{i,\kappa},$$

wherein $P^E_{i,\kappa}$ is an active power of the gas generator κ connected to a bus i in the target power grid system, $N^e$ is a set of the buses in the target power grid system, and $\Omega^e_{E,i}$ is a set of the started gas generators connected to the bus i in the target power grid system; and S600: the target linear planning model is solved to obtain target powers of the started gas generators in the target power grid system, and scheduling is performed according to the target powers, so that the powers of the started gas generators in the target power grid system reach the corresponding target powers.

The power grid of the isolated offshore oil and gas field with the wind power bearing capacity to be evaluated is regarded as the target power grid system. The wind power bearing capacity of the target power grid system is evaluated through S100-S600. In the operating process of the power grid of the isolated offshore oil and gas field, the gas compressors have been started to operate. In the embodiment, the gas compressors refer to the gas compressors that have been started in the target power grid system.

When the powers of the gas compressors of the target power grid system are scheduled, it needs to reduce the sum of the powers of the gas generators as much as possible without violating the operating constraints of an electricity-gas interconnected system, so as to realize the objective of low-carbon operation. In the embodiment, the target linear planning model with the constraints is constructed. The target function of the target linear planning model is $$\min \sum_{i \in N^e} \sum_{\kappa \in \Omega^e_{E,i}} P^E_{i,\kappa},$$

wherein $$\min \sum_{i \in N^e} \sum_{\kappa \in \Omega^e_{E,i}} P^E_{i,\kappa}$$

is the active power of the gas generator κ connected to the bus i in the target power grid system, $N^e$ is the set of the buses in the target power grid system, and $\Omega^e_{E,i}$ is the set of the started gas generators connected to the bus i in the target power grid system; that is to say, the objective to solve of the target linear planning model is to obtain the powers corresponding to the gas generators which make the sum of the powers of the gas generators in the target power grid be minimum and to schedule the powers of the gas generators in the target power grid according to the result.

In the embodiment, in order to reduce carbon emission of the gas generators as much as possible in the operating process of the target power grid system and to effectively cope with randomness and fluctuation of wind power, various constraints are constructed in the target linear planning model. The constraints in the target linear planning model will be described in detail below.

The power source of the target power grid system includes wind power and the gas generators. In order to guarantee that the evaluated wind power bearing capacity of the target power grid system can cope with randomness and fluctuation of wind power, i.e., the gas generators can compensate for vacancy of the generating capacity in the target power grid system when wind power fluctuates randomly, in the embodiment, a part of constraints in the target linear planning model are determined in combination with the ramp demand and the capacity adjusting demand, so that the solved result can cope with randomness and fluctuation of wind power.

Figure 2:
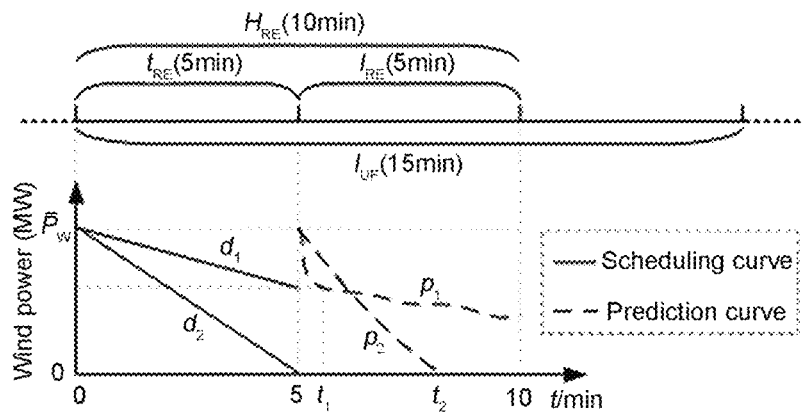
FIG. 2 is a schematic diagram of a scheduling period in the embodiment of the wind power accommodation oriented low-carbon operation scheduling method for offshore oil and gas platform energy system provided by the present application.

On the one hand, based on an ultra-short term power generation prediction technique for offshore wind power and real-time safe and economic scheduling, in the embodiment, the scheduling period is set. As shown in FIG. 2, the real-time safe and economic scheduling includes two time windows: $t_{RE}$ and $I_{RE}$. The real-time safe and economic scheduling plays a major role of solving influence of wind power ramp on flexible and safe operation of the target power grid system in the time window of the next time period $I_{RE}$ within the time window $t_{RE}$. That is to say, it needs to guarantee that within the preset scheduling period $I_{RE}$, power fluctuation caused by wind power fluctuation can be compensated by the gas generators. Although wind power ramp can be initiatively limited by means of the energy management system when wind power climbs upwards due to increase of wind speed, wind power energy will be wasted in such a manner and the gas generators operate with unnecessarily high power. When the wind power climbs downwards due to decrease crease of wind speed, the gas generators have to possess recombined upward ramp abilities to compensate power shortage of the isolated microgrid. Therefore, in the method provided by the present application, besides the upward ramp demand caused by wind power, it also needs to consider the downward ramp demand caused by wind power. As the reactive power regulating ability of the generator is mainly dependent on an excitation system, the corresponding speed is quite high, so that the ramp rate of the active power is only considered herein. In order to guarantee normal operation, by considering the worst scenario in which the power of wind power is directly decreased to 0 from the maximum access power or is directly increased from 0 to the maximum access power within the preset scheduling period $I_{RE}$, the maximum upward ramp flexibility demand and downward ramp flexibility demand of wind power are respectively:

$$R^{UP}_W = R^{DW}_W = \frac{1}{I_{RE}} \sum_{i \in N^e_W} P^w_i, \tag{1}$$

wherein the scheduling period $I_{RE}$ can be selected according to an actual application scenario, for example, 5 min, 6 min and the like.

The upward ramp ability and the downward ramp ability of the gas generator in the target power grid system need to satisfy the maximum upward ramp flexibility demand and downward ramp flexibility demand of wind power, and meanwhile, the upward ramp ability and the downward ramp ability of the gas generator in the target power grid system also need to satisfy the upward ramp demands and the downward ramp demands of all loads in the target power grid system simultaneously. Therefore, there are constraints as follows:

$$R^{UM} = \sum_{i \in N^e} \sum_{\kappa \in \Omega^e_{E,i}} R^{UP}_{E,i,\kappa} - \left( R^{UP}_W + R^{UP}_D \right) \geq 0 \tag{2}$$

$$R^{DM} = \sum_{i \in N^e} \sum_{\kappa \in \Omega^e_{E,i}} R^{DW}_{E,i,\kappa} - \left( R^{DW}_W + R^{DW}_D \right) \geq 0, \tag{3}$$

wherein $R^{UM}$ and $R^{DM}$ are respectively upward and downward ramp flexibility indexes of the target power grid system, $N^e_W$ is the bus set capable of being connected to the wind generator in the target power grid system, $P^W_i$ is the power of the wind generator connected to the bus i in the target power grid system, $R^{UP}_W$ and $R^{DW}_W$ are respectively the maximum upward ramp flexibility demand and the maximum downward ramp flexibility demand caused by wind power, $I_{RE}$ is the scheduling period, $R^{UP}_D$ and $R^{DW}_D$ are respectively the upward ramp demand the downward ramp demand on the gas generator by the loads of the target power grid system, and $R^{UP}_{E,i,\kappa}$ and $R^{DW}_{E,i,\kappa}$ are respectively the upward ramp ability and the downward ramp ability of the started gas generator at the bus i in the power grid system.

In order to guarantee that the target power grid system can operate flexibly and safely in the severest scenario, the gas generator needs to balance the power fluctuation of wind power and has certain regulating adequacy, so that there are following constraints for the power and the wind power capacity of the gas generator:

$$P^M = \sum_{i \in N^e} \sum_{\kappa \in \Omega^e_{E,i}} \overline{P}^E_{i,\kappa} - \left(\overline{P}_W + \sum_{i \in N^e} \sum_{\kappa \in \Omega^e_{E,i}} P^E_{i,\kappa}\right) \geq 0 \quad (4)$$

$$\overline{P}_W = \sum_{i \in N^e_W} P^W_i, \quad (5)$$

wherein $\overline{P}_W$ is the total capacity of wind power connected to the target power grid system, $P^W_i$ is the power of the wind generator connected to the bus i in the target power grid system, $N^e_W$ is the bus set of the wind generators capable of being connected in the target power grid system, $P^E_{i,\kappa}$ is the active power of the gas generator, $\overline{P}^E_{i,\kappa}$ is the upper limit of $P^E_{i,\kappa}$ as is the rated capacity of the gas generator, and $\Omega^e_{E,i}$ is the set of the started gas generators connected to the bus i in the target power grid system.

As described above, the target function of the target linear planning model for evaluating the wind power bearing capacity of the target power grid system is:

$$\min \sum_{i \in N^e} \sum_{\kappa \in \Omega^e_{E,i}} P^E_{i,\kappa} \quad (6)$$

When the wind power bearing capacity of the power grid of the offshore oil and gas field is evaluated, it needs to consider feasibility, i.e., the wind power bearing capacity corresponding to the evaluation result does not exceed the operating characteristics of the gas generator set, the gas compressors and the grid-connected wind power generators in the power grid. Therefore, in the target linear planning model, besides the gas power generation and wind power synergetic ramp flexibility constraint, the gas generating capacity and wind power capacity synergetic flexibility constraint, the constraints further include the operating characteristic constraint of the gas generator set, the operating characteristic constraint of the gas compressor and the grid-connected operating characteristic constraint of the wind generator.

Specifically, by considering the start-stop states of all the gas generators, the operating characteristic constraint of the gas generator set in the target power grid system is:

$$\underline{P}^E_{i,\kappa} \leq P^E_{i,\kappa} \leq \overline{P}^E_{i,\kappa}, i \in N^e, \kappa \in \Omega^e_{E,i} \quad (7)$$

$$\underline{Q}^E_{i,\kappa} \leq Q^E_{i,\kappa} \leq \overline{Q}^E_{i,\kappa}, i \in N^e, \kappa \in \Omega^e_{E,i} \quad (8)$$

$$P^E_{i,\kappa} \tan(\cos^{-1}\overline{\lambda}^E_{i,\kappa}) \leq Q^E_{i,\kappa} \leq P^E_{i,\kappa} \tan(\cos^{-1}\underline{\lambda}^E_{i,\kappa}), i \in N^e, \kappa \in \Omega^e_{E,i} \quad (9)$$

$$R^{UM} \geq 0 \quad (10)$$

$$R^{DM} \geq 0 \quad (11)$$

$$P^M \geq 0 \quad (12)$$

wherein $P^E_{i,\kappa}$ and $Q^E_{i,\kappa}$ are respectively active and reactive powers of the gas generator, $\overline{P}^E_{i,\kappa}$ and $\overline{Q}^E_{i,\kappa}$ are respectively upper limits of $P^E_{i,\kappa}$ and $Q^E_{i,\kappa}$, are the rated capacity of the gas generator, $\underline{P}^E_{i,\kappa}$ is an upper limit of $P^E_{i,\kappa}$, $\underline{Q}^E_{i,\kappa}$ is an upper limit of $Q^E_{i,\kappa}$, $\overline{\lambda}^E_{i,\kappa}$ and $\underline{\lambda}^E_{i,\kappa}$ are respectively upper and lower limits of output power factors of the gas generator connected to the bus i in the target power grid system, and $\Omega^e_{E,i}$ is the set of the gas generators connected to the bus i in the target power grid system.

Formula (7) is the active output constraint of the gas generator, formula (8) represents the reactive output constraint of the gas generator, formula (9) represents a relation between the active output power and the reactive output power of the gas generator, which defines the power factor of output, so as to guarantee safe and stable operation of the gas generator.

The grid-connected operating characteristic constraint of the wind generator is:

$$\underline{P}^W_i \leq P^W_i \leq \overline{P}^W_i, i \in N^e_W \quad (13)$$

$$\underline{Q}^W_i \leq Q^W_i \leq \overline{Q}^W_i, i \in N^e_W \quad (14)$$

$$\underline{Q}^W_i = -P^W_i \tan(\cos^{-1}(\lambda^W_i)), i \in N^e_W \quad (15)$$

$$\overline{Q}^W_i = P^W_i \tan(\cos^{-1}(\lambda^W_i)), i \in N^e_W \quad (16)$$

wherein $\underline{P}^W_i$ and $\overline{P}^W_i$ are respectively upper and lower limits of the active power of the wind generator connected to the bus i in the target power grid system, $\overline{Q}^W_i$ and $\underline{Q}^W_i$ are upper and lower limits of the reactive power of the wind generator connected to the bus i in the target power grid system, $\underline{P}^W_i$ and $\underline{Q}^W_i$ are usually set to be 0, and the power factor range of wind power connected to the bus i of the microgrid ranges from $-\lambda^W_i$ (capacitive) to $\lambda^W_i$ (inductive).

Formula (13) and formula (14) respectively represent the active and reactive output constraints of the wind generator. As the wind generator has a certain reactive regulating ability, the available power factor in the regulating range is represented as $-\lambda^W_i$ (capacitive) to $\lambda^W_i$ (inductive), and formula (15) and formula (16) represent the reactive regulating performance of the wind generator.

The operating characteristic constraint of the gas compressor includes a power constraint of a prime motor and a constraint of a stable operating zone, wherein the power constraint of the prime motor of the gas compressor can be represented as:

$$P^C_\kappa = \frac{\pi_{in,\kappa} f^C_\kappa \alpha}{\varphi(\alpha-1)}\left[\frac{\alpha-1}{\gamma^\alpha_\kappa - 1}\right], \quad \kappa \in \Omega^g_C \quad (17)$$

$$0 \leq P^C_\kappa \leq \overline{P}^C_\kappa, \quad \kappa \in \Omega^g_C \quad (18)$$

Formula (17) represents the active power consumption of the primer motor of the gas compressor during natural gas transportation, and formula (18) represents the limit of the rated power of the primer motor of the gas compressor.

The actual stable operating zone of the gas compressor is a polygonal zone encircled by four nonlinear curves (an inrush current limiting curve, a maximum/minimum rotating speed limiting curve of the primer motor and a maximum gas flow rate curve). Each operating point in the stable operating zone is a stable operating point. Exceeding the stable operating zone, unstable phenomena such as surge of the gas compressor are likely to occur. The nonlinear model has many defects such as difficulty to solve the optimal solution and low solving speed. Therefore, in the embodiment, the stable operating zone of the compressor is linearly simplified. An internally tangent quadrangle in the nonlinear region is used for replacing the original nonlinear region, so that the nonlinear constraint of the stable operating zone of the gas compressor can be represented as the linear constraint and has an enough calculation accuracy. In the method provided by the embodiment, the constraint of the stable operating zone of the gas compressor can be represented as:

$$f_{\kappa,k}(\gamma_\kappa, f) = A_{\kappa,k} f_\kappa^C + A'_{\kappa,k} \lambda_\kappa + A''_{\kappa,k} \leq 0, k = 4 \quad (19)$$

$$\gamma_\kappa = \pi_{out,\kappa} / \pi_{in,\kappa} = \sqrt{\Pi_{out,\kappa} / \Pi_{in,\kappa}} \quad (20)$$

Formula (19) represents four boundaries of the linear stable operating zone, and formula (20) represents the compression ratio of the gas compressor.

Formulae (17) and (20) are rewritten to obtain:

$$\ln \Pi_{out,\kappa} - \ln \Pi_{in,\kappa} = 2\ln \gamma_\kappa, \kappa \in \Omega_C^g \quad (21)$$

$$\ln P_\kappa^C = \ln \frac{\alpha}{(\alpha-1)\varphi} + \frac{1}{2}\ln \Pi_{in,\kappa} + \ln f_\kappa^C + \ln A_\kappa, \kappa \in \Omega_C^g \quad (22)$$

$$\ln(A_\kappa + 1) = \frac{\alpha-1}{\alpha}\ln \gamma_\kappa, \kappa \in \Omega_C^g \quad (23)$$

By integrating formulae (17) to (23), the operating characteristic constraint of the gas compressor in the target power grid system is:

$$f_{\kappa,k}(\gamma_\kappa, f) = A_{\kappa,k} f_\kappa^C + A'_{\kappa,k} \gamma_\kappa + A''_{\kappa,k} \leq 0, k = 4 \quad (24)$$

$$\ln \Pi_{out,\kappa} - \ln \Pi_{in,\kappa} = 2\ln \gamma_\kappa, \kappa \in \Omega_C^g \quad (25)$$

$$\underline{\gamma}_\kappa \leq \gamma_\kappa \leq \overline{\gamma}_\kappa \quad (26)$$

$$\ln P_\kappa^C = \ln \frac{\alpha}{(\alpha-1)\varphi} + \frac{1}{2}\ln \Pi_{in,\kappa} + \ln f_\kappa^C + \ln A_\kappa, \kappa \in \Omega_C^g \quad (27)$$

$$\ln(A_\kappa + 1) = \frac{\alpha-1}{\alpha}\ln \gamma_\kappa, \kappa \in \Omega_C^g \quad (28)$$

$$0 \leq P_\kappa^C \leq \overline{P}_\kappa^C, \kappa \in \Omega_C^g, \quad (29)$$

wherein $\Omega_C^g$ is the set of the gas compressors, $f_{\kappa,k}$ is the linear function of the kth boundary of the gas compressor $\kappa$, $A_{\kappa,k}$, $A'_{\kappa,k}$ and $A''_{\kappa,k}$ are linear parameters, $\gamma_\kappa$ is the compression ratio of the gas compressor $\kappa$, $\underline{\gamma}_\kappa$ and $\overline{\gamma}_\kappa$ are respectively upper and lower limits thereof, $\pi_{out,\kappa}$ and $\pi_{in,\kappa}$ are inlet and outlet pressures of the gas compressor, $\Pi_{out,\kappa} = (\pi_{out,\kappa})^2$, $\Pi_{in,\kappa} = (\pi_{in,\kappa})^2$ and $A_\kappa$ are intermediate variable, $P_\kappa^C$, $f_\kappa^C$, $\alpha$ and $\varphi$ are the active demand, the flow, the variable factor and the mechanical efficiency of the gas compressor $\kappa$, and $\overline{P}_\kappa^C$ is the rated power of the prime motor of the gas compressor.

In order to further consider the electric coupling relation in the offshore isolated microgrid, the accuracy of the low-carbon operation scheduling result is improved. In the embodiment, the constraints of the target linear planning model further include power flow constraint of the power network and an operation constraint of the gas network. The method further includes:
the power flow constraint of the power grid is constructed according to power parameters of each bus in the target power grid system; and
the operation constraint of the gas network is constructed according to operating parameters of each natural gas pipeline in the target power grid system.

Specifically, a linear power flow model adapted to the offshore isolated microgrid of the oil and gas field is to fully meet the characteristics of the microgrid featuring high submarine cable charging power and high reactive power interaction. By taking the power branch $\ell = (i,j)$ between the buses i and j as an example, the power flow constraint of the power network is:

$$P_\ell^L + P_{\ell'}^L = r_\ell l_\ell \quad (30)$$

$$Q_\ell^L + Q_{\ell'}^L = x_\ell l_\ell \quad (31)$$

$$v_j = v_i - 2(r_\ell P_\ell^L + x_\ell Q_\ell^L) + (r_\ell^2 + x_\ell^2) l_\ell \quad (32)$$

$$2(P_\ell^L)^2 + 2(Q_\ell^L)^2 + v_i^2 + l_\ell^2 = (v_i + l_\ell)^2 \quad (33)$$

$$Q_{\ell,i}^S = -v_i b_\ell / 2 \quad (34)$$

$$Q_{\ell,j}^S = -v_j b_\ell / 2 \quad (35)$$

$$\underline{U}_i^2 \leq v_i \leq \overline{U}_i^2, i \in N^e \quad (36)$$

$$(P_\ell^L)^2 + (Q_\ell^L)^2 \leq \overline{S}_{ij}^L, \ell \in \Omega_L^e \quad (37)$$

$$\underline{l}_\ell \leq l_\ell \leq \overline{l}_\ell, \ell \in \Omega_{L,i}^e \quad (38)$$

$$\sum_{\kappa \in \Omega_{E,i}^e} P_{i,\kappa}^E + P_i^W = \sum_{\kappa \in \Omega_{D,i}^e} P_{i,\kappa}^D + \sum_{\ell \in \Omega_{L,i}^e} P_\ell^L \quad (39)$$

$$\sum_{\kappa \in \Omega_{E,i}^e} Q_{i,\kappa}^E + Q_i^W = \sum_{\kappa \in \Omega_{D,i}^e} Q_{i,\kappa}^D + \sum_{\ell \in \Omega_{L,i}^e} Q_\ell^L + \sum_{\ell \in \Omega_{L,i}^e} Q_{\ell,i}^S, \quad (40)$$

wherein $\Omega_L^e$ represents the power branch set, $\ell \in \Omega_L^e$, $P_i^L$ and $Q_i^L$ represent the active power and the reactive power of the flow direction from the bus i to the bus j in a branch l, $P_{i'}^L$ and $Q_{i'}^L$ represent the active power and the reactive power of the flow direction from the bus j to the bus i in the branch l, $r_i$ and $x_i$ represent resistance and inductive reactance of the branch, $v_i$ and $v_j$ represent squares of voltage magnitudes of the bus i and the bus j, $U_i$ represent a voltage amplitude of the bus i, $\overline{U}_i$ and $\underline{U}_i$ are a maximum value and a minimum value of $U_i$, $\overline{l}_\ell$ represent the square of the voltage amplitude of the bus i, $b_\ell$ represents equivalent charging capacitance of the branch, $Q_{\ell,i}^S$ and $Q_{\ell,j}^S$ respectively represent equivalent charging reactive powers connected to the bus i and the bus j, $\overline{S}_{ij}^L$ is the rated capacity of the power branch, $\Omega_{D,i}^e$ represents the load set of the bus i, $\Omega_{L,i}^e$ represents the set of branches connected to the bus i, $P_{i,\kappa}^E$ and $Q_{i,\kappa}^E$ respectively represent the active power and the reactive power of the gas generator, $Q_i^W$ is the reactive power of the wind generator the bus i in the target power grid system with the rated output, $P_{i,\kappa}^D$ represents the active power of the load connected to the bus i, and $Q_{i,\kappa}^D$ represents a reactive power of the load connected to the bus i. Formula (39) represents the active power flow constraint of the power network, and formula (40) represents the reactive power flow constraint of the power network.

In the embodiment, the natural gas pipeline model is established by using the Weymouth equation, and the constraint of the gas network is established accordingly, specifically as follows:

$$2z_{\ell,3} - f_\ell = K_\ell \sqrt{B_\ell} \quad (41)$$

$$B_\ell = 2(z_{\ell,1} - z_{\ell,2}) - \Pi_m + \Pi_n \quad (42)$$

-continued $$x_\ell \underline{f}_\ell \leq z_{\ell,3} \leq x_\ell \overline{f}_\ell \tag{43}$$

$$f_\ell + (x_\ell - 1)\overline{f}_\ell \leq z_{\ell,3} \leq f_\ell + (x_\ell - 1)\underline{f}_\ell \tag{44}$$

$$x_\ell \Pi_m \leq z_{\ell,1} \leq x_\ell \overline{\Pi}_m \tag{45}$$

$$\Pi_m + (x_\ell - 1)\overline{\Pi}_m \leq z_{\ell,1} \leq \Pi_m + (x_\ell - 1)\underline{\Pi}_m \tag{46}$$

$$x_\ell \underline{\Pi}_n \leq z_{\ell,2} \leq x_\ell \overline{\Pi}_n \tag{47}$$

$$\Pi_n + (x_\ell - 1)\overline{\Pi}_n \leq z_{\ell,2} \leq \Pi_n + (x_\ell - 1)\underline{\Pi}_n \tag{48}$$

$$\sum_{\kappa \in \Omega_{E,m}^g} f_{m,\kappa}^E + \sum_{\ell \in \Omega_{L,m}^g} f_\ell + \sum_{\kappa \in \Omega_{D,m}^g} f_{m,\kappa}^D = \sum_{\kappa \in \Omega_{S,m}^g} f_{m,\kappa}^S, \, m \in N^g, \tag{49}$$

wherein $z_{\ell,1}$, $z_{\ell,2}$, $z_{\ell,3}$ and $x_\ell \in \{0,1\}$ are assistant variables, $K_i$ is the coefficient of the Weymouth equation of the natural gas pipeline, $f_\ell$ is the intermediate variable, $\Omega_L^g$ represents the set of the natural gas pipelines, $B_\ell$ is a gas flow rate of the pipeline, $\overline{f}_\ell$ and $\underline{f}_\ell$ represent the maximum value and the minimum value of $f_\ell$, $\pi_m$ and $\pi_n$ are respectively gas pressures at pipeline nodes m and n, and $\Pi_m = (\pi_m)^2$ and $\Pi_n = (\pi_n)^2$, $\overline{\Pi}_m$ and $\underline{\Pi}_m$ represent the maximum value and the minimum value of $\Pi_m$, $\overline{\Pi}_n$ and $\underline{\Pi}_n$ represent the maximum value and the minimum value of $\Pi_n$, $N^g$ is the pipeline node set, $\Omega_{E,m}^g$ is the set of the gas generators connected to the pipeline node m, $\Omega_{L,m}^g$ is the set of the gas generators connected to the pipeline node m, $\Omega_{D,m}^g$ is the set of gas loads connected to the pipeline node m, $\Omega_{S,m}^g$ is the set of gas sources connected to the pipeline node m, $f_{m,\kappa}^E$ is the gas flow rate consumed by the gas generator, $f_{m,\kappa}^D$ is the gas flow rate needed by the gas load, and $f_{m,\kappa}^S$ is the gas flow rate supplied by the gas source.

As described above, as the nonlinear model has the defects of difficulty to solve the optimal solution, low solving speed and the like, in the embodiment, the nonlinear items in all the constraints are linearly processed, i.e., the constructing the target linear planning model includes:

linear processing is performed on a non-linearized item in each constraint by using a univariate piecewise linearized function, so as to obtain the target linear planning model.

Specifically, it is assumed that a piecewise linear function defined at an interval $[a_{min}, a_{max}]$ is represented as $H=h(a)$, the interval is divided into $N_{seg}$ segments and corresponding segments satisfy $a_{min} \leq a_1 \leq \ldots \leq a_{N_{seg}-1} \leq a_{max}$, corresponding functions are represented as $h(\alpha_i)$ and $i \in V := \{0,1,2,\ldots,N_{seg}\}$. The functions are specifically represented as follows:

$$a_i = a_0 + \sum_{i=1}^{N_{seg}} \delta_i(a_i - a_{i-1}) \tag{50}$$

$$\vartheta_{i+1} \leq \delta_i \leq \vartheta_i, \, i = 1, 2, \ldots, N_{seg} - 1 \tag{51}$$

$$0 \leq \delta_i \leq 1, \, i = 1, 2, \ldots, N_{seg} \tag{52}$$

$$\vartheta_i \in \{0, 1\}, \, i = 1, 2, \ldots, N_{seg} - 1, \tag{53}$$

wherein $\delta_i$ and $\vartheta_i$ are the assistant variables.

Thus, the target linear planning model can be represented as:

$$\min \sum_{i \in N^e} \sum_{\kappa \in \Omega_{E,i}^e} P_{i,\kappa}^E \tag{54}$$

s.t. (1)–(5), (7)–(53)

The target linear planning model is a mixed shaping linear planning model which can be solved by using a universal commercial linear planning solver, for example, MATLAB R2020a and CPLEX12.9.0. The solved target function value is the target power of each gas generator with the lowest carbon emission of the target power grid system. Based on the solution result, each gas generator can be scheduled, so that the power of each gas generator reaches the corresponding target power, i.e., the power of each gas generator is set to be the target power.

It can be easily seen that for the uncertainty and fluctuation of wind power, the method provided by the embodiment, based on the ultra-short term power generation prediction technique for offshore wind power and the real-time safe and economic scheduling, provides the ramp flexibility index and the power flexibility index of the electricity-gas comprehensive energy system of the offshore wind power accommodation oriented offshore oil and gas platform by considering synergism between gas generator ramp and wind power ramp and synergism between the gas generator capacity and the wind power capacity. In further combination with the flexibility indexes, the low-carbon economic scheduling linear optimization model of the electricity-gas comprehensive energy system of the offshore oil and gas platform considering the grid-connected operating characteristics of the wind generators, the operating characteristics of the gas generators and the operating characteristics of the gas compressors to obtain the offshore wind power accommodation capacity, thereby realizing flexible and safe operation of the electricity-gas comprehensive energy system of the offshore wind power accommodation oriented offshore oil and gas platform. The following problems can be solved by applying the method:

the method provided by the embodiment can scientifically evaluate the flexibility of the electricity-gas comprehensive energy system of the offshore oil and gas platform and can guarantee flexible and safe operation of the electricity-gas comprehensive energy system of the offshore wind power-connected offshore oil and gas platform;

the method provided by the embodiment can discriminate critical factors that affect low-carbon flexible operation of the electricity-gas comprehensive energy system of the offshore wind power-connected offshore oil and gas platform for specific application calculating examples; and the method provided by the embodiment can be helpful for the operators to determine a proper investment solution based on existing infrastructures, so as to further improve the low-carbon flexible operation ability of the electricity-gas comprehensive energy system of the offshore oil and gas platform.

Figure 3:
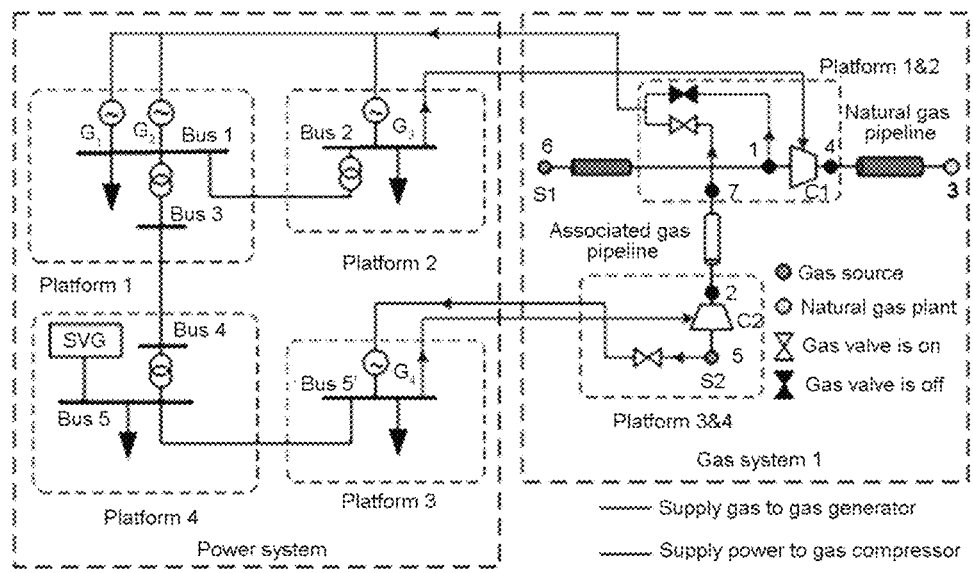
FIG. 3 is a schematic structural diagram of a validity application example I of the wind power accommodation oriented low-carbon operation scheduling method for offshore oil and gas platform energy system provided by the present application.
Figure 4:
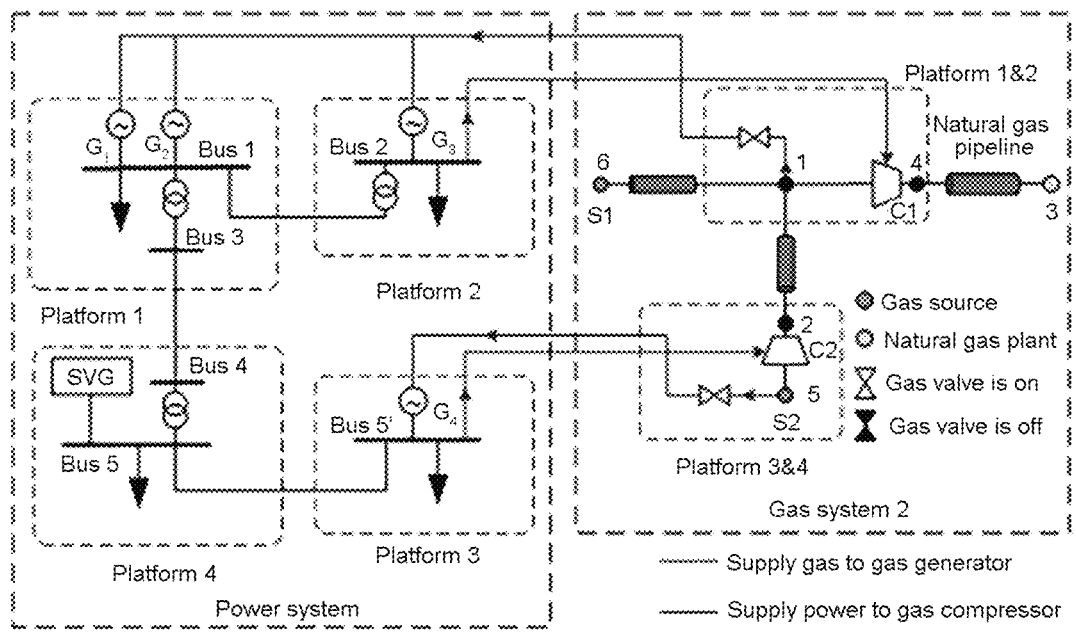
FIG. 4 is a schematic structural diagram of a validity application example II of the wind power accommodation oriented low-carbon operation scheduling method for offshore oil and gas platform energy system provided by the present application.

In order to verify the validity of the method provided by the embodiment, two application examples are set. The system structure in the example 1 is as shown in FIG. 3, and the system structure in the example 2 is as shown in FIG. 4. The system structures differ significantly in fuel gas supply modes of the gas generators in the offshore oil and gas platforms 1 and 2. In the example 1, the fuel gas supply modes of the gas generators in the offshore oil and gas platforms 1 and 2 are exclusive pipeline modes. In the example 2, fuel gases of the gas generators in the offshore oil and gas platforms 1 and 2 are selected from a node of the natural gas transportation pipeline network. The two examples are set to mainly consider two actual conditions in current and future offshore oil and gas fields. With rolling development of the offshore oil and gas fields, a part of offshore oil and gas fields are short in associated gas, and at the time, other platforms need to transport the associated gas or the natural gas as the fuel gas of the gas generators through pipelines, corresponding to the example 1. Alternatively, the offshore oil and gas platform severs as a node for natural gas transportation, and the fuel gas of the gas generator on the platform can be naturally acquired from the natural gas transportation pipeline network conveniently, corresponding to the example 2.

Specific settings and verification results of the examples 1 and 2 are described below.

(1) EXAMPLE 1

In FIG. 3, the isolated microgrid includes four 4.5 MW gas generators (G1-G4), and the fuel gas can be the natural gas and the associated gas or a mixture thereof. The total load of the system is 5.82 MW, and the reactive power demand is about 3.5 MVar, excluding two gas compressors. As the gas compressor is the coupling element for the microgrid and the gas network, the power demand changes dependent on gas flow fluctuation caused by output change of offshore wind power. For reactive compensation for the system, a static var generator (SVG) is installed on the platform 4. The fuel gases of the gas generators on the platforms 1 and 2 are selected from the nodes 1 and 7 of the gas network.

The gas network system includes two gas compressors (C1-C2) and two gas sources (S1-S2). The gas compressors are respectively connected to the buses 2 and 3 of the microgrid. S1 is the natural gas source which mainly satisfies the demand of a natural gas plant; and S2 is an associated gas source which mainly satisfies the fuel gas supply of the gas generators. When the associated gas is short, the gas generators consume the natural gas.

(2) EXAMPLE 2

The example 2 is primarily different from the example 1 in type of the gas source. In the example 2, all the gas sources are natural gas which are gathered on the platforms 1 and 2 and are jointly delivered out via the compressor C1. The supply rate of natural gas of S2 is constant, and S1 is responsible for supplying natural gas vacancy and is used for regulating load fluctuation.

Figure 5:
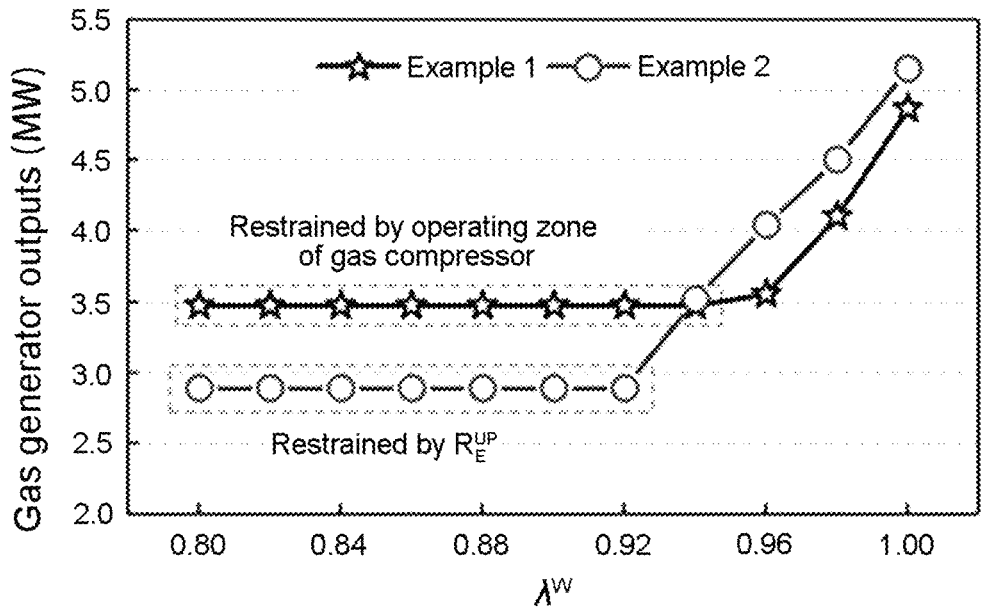
FIG. 5 is a schematic diagram of a generating capacity of a gas generator corresponding to a scheduling result of the validity application example of the wind power accommodation oriented low-carbon operation scheduling method for offshore oil and gas platform energy system provided by the present application.
Figure 6:
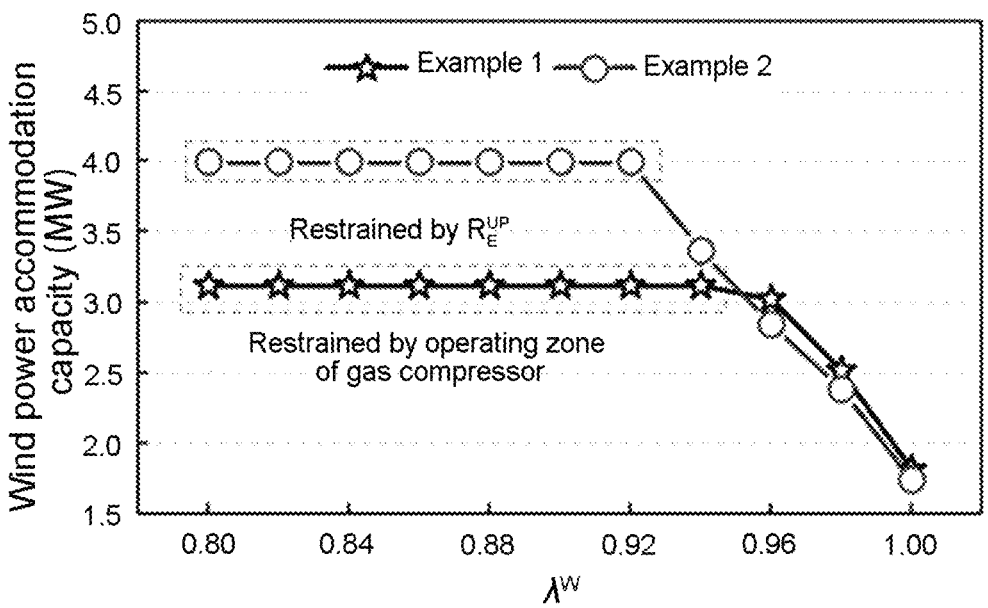
FIG. 6 is a wind power accommodation capacity corresponding to the scheduling result of the validity application example of the wind power accommodation oriented low-carbon operation scheduling method for offshore oil and gas platform energy system provided by the present application.
Figure 7:
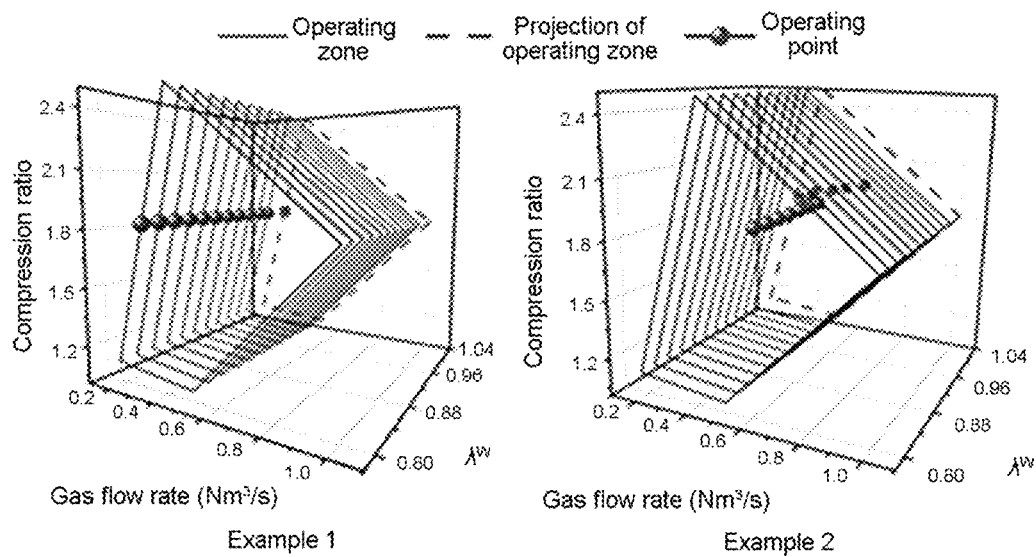
FIG. 7 is a schematic diagram of a stable operating state of a gas compressor in the validity application example of the wind power accommodation oriented low-carbon operation scheduling method for offshore oil and gas platform energy system provided by the present application.

It is assumed that the generators G1 and G2 operate, wind power is connected to the bus 1. The generating capacities of the gas generators in the examples 1 and 2 are as shown in FIG. 5. The offshore wind power accommodation capacities are as shown in FIG. 6. It can be seen from FIG. 5 that when the minimum power factor limit of the fan is smaller than 0.94, the output of the gas generator in the example 2 is smaller than that of the gas generator in the example 1, i.e., the carbon emission in the example 2 is smaller than that in the example 1. As shown in FIG. 6, correspondingly, the offshore wind power accommodation capacity in the example 2 is higher than that in the example 1. On the contrary, when the minimum power factor limit of the fan is greater than 0.94, the output of the gas generator in the example 2 is higher than that of the gas generator in the example 1, i.e., the carbon emission in the example 2 is higher than that in the example 1. Correspondingly, the offshore wind power accommodation capacity in the example 2 is lower than that in the example 1. Meanwhile, it can be seen from FIG. 7 that the example 1 is mainly subjected to the operating zone constraint of the compressor of the gas generator. The example 2 is mainly subjected to constraint of deficiency of the ramp rate of the generator.

It can be seen from the application examples that the present application can evaluate the lowest carbon emission of the gas generators in operation of the microgrid of the offshore oil and gas platform and can discriminate the critical factors that affect carbon emission by comparing the powers of the gas generators obtained by model evaluation by changing different factors, thereby providing constructors and operators with effective reference.

In conclusion, the embodiment of the present application provides a low-carbon operation scheduling method for an energy system of a wind power accommodation oriented offshore oil and gas platform. Aiming uncertainty and fluctuation of wind power, the system constructs the target linear planning model. The target function result of the model is the lowest power synthesis of the gas generator. Constraints of the model include the gas power generation and wind power synergetic ramp flexibility constraint, the gas generating capacity and wind power capacity synergetic flexibility constraint, the operating characteristic constraint of the gas generator set, the operating characteristic constraint of the gas compressor and the grid-connected operating characteristic constraint of the wind generator. The gas power generation and wind power synergetic ramp flexibility constraint is constructed according to the maximum upward and downward ramp demand of wind power and the ramp ability of the gas generator within the scheduling period, thereby guaranteeing that the finally calculated wind power bearing capacity can satisfy the condition that wind power ramp affects flexible and safe operation of the power grid system within the scheduling period. The gas generating capacity and wind power capacity synergetic flexibility constraint is established according to the rated power of the gas generator in the power grid system, thereby guaranteeing that the gas generator in the power grid system has certain adequacy due to the finally calculated wind power bearing capacity. The operating characteristic constraint of the gas generator set, the operating characteristic constraint of the gas compressor and the grid-connected operating characteristic constraint of the wind generator can guarantee that the calculated wind power bearing capacity can satisfy the operating characteristics of the wind generator set, the gas generator and the gas compressor. The scheduling method provided by the present application can effectively cope with uncertainty and fluctuation of wind power to schedule the power of the gas generator in the system in the operating process of the power grid system of the offshore oil and gas field, so as to reduce carbon emission of the energy system of the offshore oil and gas field.

It is to be understood that although various steps in the flow chart in the drawings are shown sequentially as indicated by the arrows, these steps are not necessarily performed sequentially as indicated by the arrows. Unless explicitly stated otherwise herein, the steps are not performed in a strict order limitation, and the steps may be performed in other orders. Moreover, at least part of the steps in the flow chart may include a plurality of sub-steps or phases that are not necessarily performed at the same time, but may be performed at different times. The sub-steps or phases are not necessarily performed sequentially, but may be performed in turn or alternately with at least part of the other steps or the sub-steps or phases of the other steps.

Those of ordinary skill in the art may understand that all or part of flows in the methods of the embodiment is implemented by instructing related hardware via the computer program. The computer program may be stored in a nonvolatile computer readable storage medium. When the computer program is executed, it may include flows of the embodiments of the above methods. Any citation of the memory, storage, database or other media provided by the present application and used in the embodiments can include a nonvolatile and/or volatile memory. The nonvolatile memory can include read-only (ROM), programmable ROM (PROM), electrical programmable ROM (EPROM), an erasable programmable ROM (EEPROM) a flash memory. The volatile memory can include a random access memory (Ram) or an external high speed cache memory. As description rather than limitation, the RAM can be obtained in various forms, for example, a static RAM (SRAM), a dynamic RAM (DRAM), a synchronous DRAM (SDRAM), a double data rate SDRM (SSRSDRAM), an enhanced SDRAM (ESDRAM), a synchronization link (Synchlink) DRAM (SLDRAM), a memory bus (Rambus), a direct RAM (RDRAM), a direct memory bus dynamic RAM (DRDRAM), a memory bus dynamic RAM (RDRAM) and the like.

Embodiment II

Figure 8:
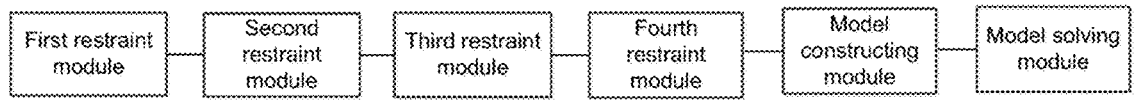
FIG. 8 is a schematic diagram of a wind power accommodation oriented low-carbon operation scheduling system for offshore oil and gas platform energy system provided by the present application.

Based on the above embodiment, the present application further correspondingly provides a wind power accommodation oriented low-carbon operation scheduling system for an offshore oil and gas platform energy system. As shown in FIG. 8, the system includes:
- a first constraint module, configured to determine the maximum upward ramp flexibility demand and the maximum downward ramp flexibility demand caused by wind power in a target power grid system according to a predetermined scheduling period, and to establish a gas power generation and wind power synergetic ramp flexibility constraint according to an upward ramp ability, a downward ramp ability, the maximum upward ramp flexibility demand and the maximum downward ramp flexibility demand of a gas generator started in the target power grid system, specifically as described in embodiment I;
- a second constraint module, configured to establish a gas generating capacity and wind power capacity synergetic flexibility constraint according to a rated capacity of the started gas generator connected to each bus in the target power grid system, specifically as described in embodiment I;
- a third constraint module, configured to establish an operating characteristic constraint of a gas generator set according to an output power factor of the started gas generator set connected to each bus in the target power grid system, and to establish an operating characteristic constraint of a gas compressor according to operating parameters of each started gas compressor in the target power grid system, specifically as described in embodiment I;
- a fourth constraint module, configured to establish a grid-connected operating characteristic constraint of a wind generator according to a power factor of the wind generator connected to each bus in the target power grid system, specifically as described in embodiment I;
- a model constructing module, configured to construct a target linear planning model, wherein constraints of the target linear planning model include the gas power generation and wind power synergetic ramp flexibility constraint, the gas generating capacity and wind power capacity synergetic flexibility constraint, the operating characteristic constraint of the gas generator set, the operating characteristic constraint of the gas compressor and the grid-connected operating characteristic constraint of the wind generator; a target function of the target linear planning model is $$\min \sum_{i \in N^e} \sum_{\kappa \in \Omega_{E,i}^e} P_{i,\kappa}^E,$$

wherein $P_{i,\kappa}^E$ is an active power of the gas generator $\kappa$ connected to a bus i in the target power grid system, $N^e$ is a set of the buses in the target power grid system, and $\Omega_{E,i}^e$ is a set of the started gas generators connected to the bus i in the target power grid system, specifically as described in embodiment I; and
- a model solving module, configured to solve the target linear planning model to obtain target powers of the started gas generators in the target power grid system, and to perform scheduling according to the target powers, so that the powers of the started gas generators in the target power grid system reach the corresponding target powers, specifically as described in embodiment I.

Embodiment III

Figure 9:
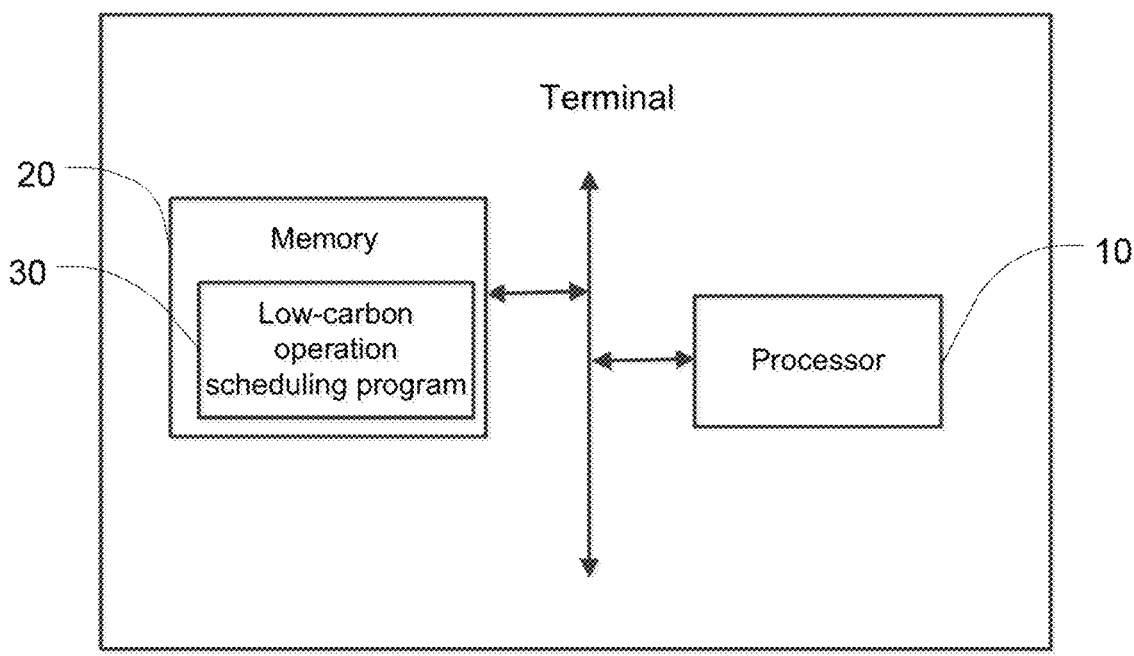
FIG. 9 is a schematic diagram of an embodiment of a terminal provided by the present application.

Based on the above embodiment, the present application further correspondingly provides a terminal. As shown in FIG. 9, the terminal includes a processor 10 and a memory 20. FIG. 9 only shows a part of components of the terminal. But it is to be understood that not all the shown components are required to be implemented, and more or less components can be implemented alternatively.

The memory 20 can be an internal storage unit of the terminal in some embodiments, for example, a hard disk or a memory of the terminal. The memory 20 can also be an external storage device of the terminal in some other embodiments, for example, a plug-in hard disk, a Smart Media Card (SMC), a Secure Digital (SD) card, a Flash Card (FC) and the like. Further, the memory 20 can further include either the internal memory unit or the external storage device of the terminal. The memory 20 is used for storing application software and various types of data installed in the terminal. The memory 20 can further be used for temporarily storing data that have been outputted or are to be outputted. In an embodiment, the memory 20 has stored the low-carbon operation scheduling program 30 capable of being executed by the processor 10 to implement the low-carbon operation scheduling method for an energy system of a wind power accommodation oriented offshore oil and gas platform in the present application.

The processor 10 can be a Central Processing Unit (CPU), a microprocessor or other chips in some embodiments for running a program code or processed data stored in the memory 20, for example, executing the low-carbon operation scheduling method for an energy system of a wind power accommodation oriented offshore oil and gas platform.

Embodiment IV

The present application provides a storage medium, wherein the storage medium has one or more programs stored thereon, the one or more programs capable of being executed by one or more processors to implement the steps of the above wind power accommodation oriented low-carbon operation scheduling method for an energy system of an offshore oil and gas platform.

Embodiment V

The present application further provides an energy management system for a microgrid of an offshore oil and gas field, including a local control layer, a coordinated control layer, and an energy management layer. The energy management layer comprises the wind power accommodation oriented low-carbon operation scheduling system for offshore oil and gas platform energy system described above, and connects to a microgrid in the local control layer through a coordinated controller and an optical fiber switch in the coordinated control layer, to perform the steps of the wind power accommodation oriented low-carbon operation scheduling method for offshore oil and gas platform energy system.

The energy management system of the microgrid of the offshore oil and gas field mainly completes the optimal scheduling decision making within each scheduling period. Therefore, the energy management system needs to coordinate various controllable devices to implement the optimal scheduling plan. The present application provides the optimal scheduling plan targeting low-carbon and needs to combine with prediction information of offshore wind power and loads to minimize carbon emission of the microgrid, so as to reduce dependence of the oil and gas platform on fossil fuels such as petroleum and natural gas.

Figure 10:
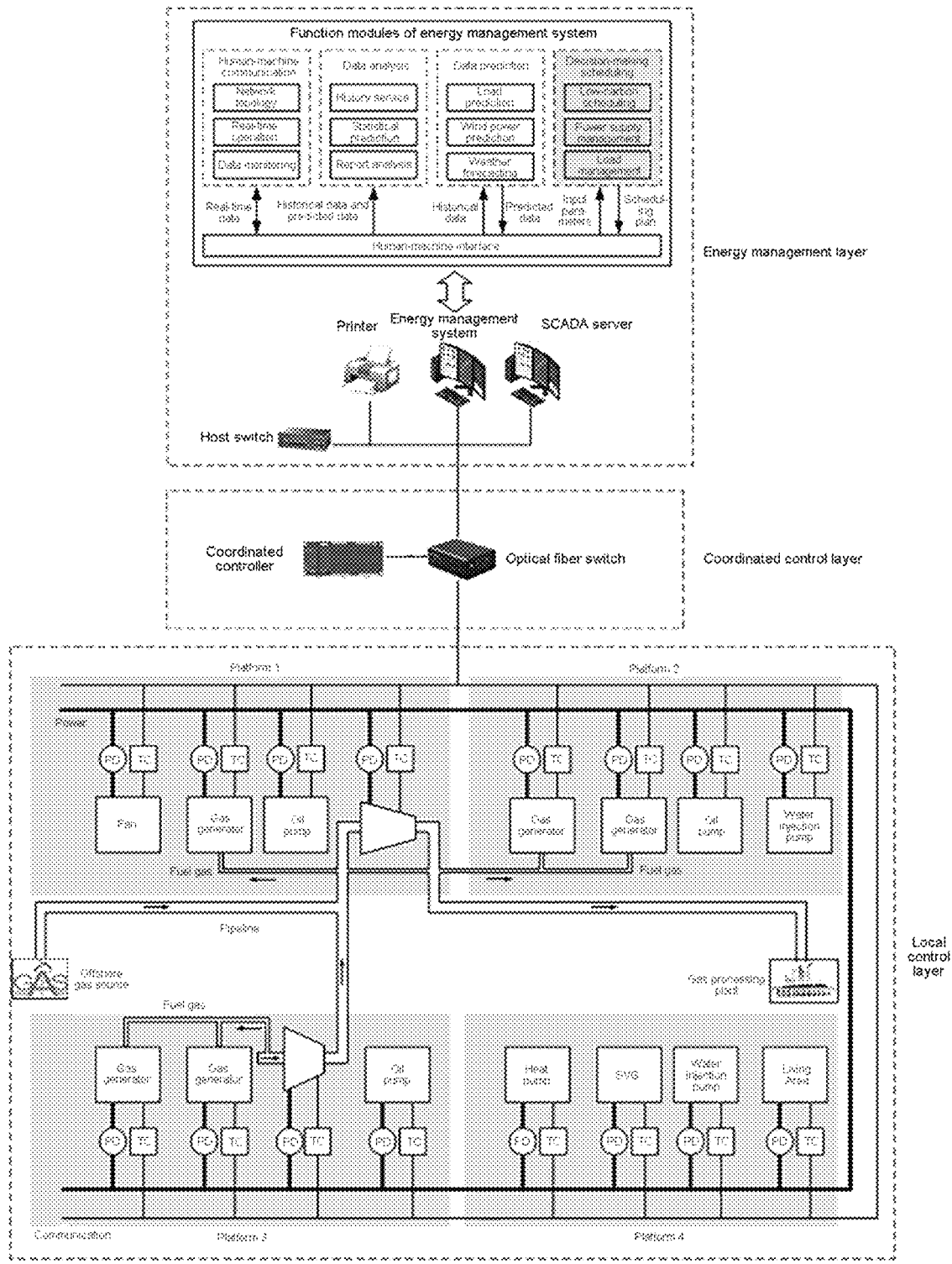
FIG. 10 is a schematic diagram of an energy management system of the microgrid of offshore oil and gas field provided by the present application.

FIG. 10 shows a system structure of the energy management system and a basic structure of the microgrid of the offshore oil and gas platform managed thereby. The energy management system is connected to units of the microgrid by means of switches, optical fibers and coordinate controllers. In order for better scheduling, management and control, the energy management system structure is divided into the energy management layer, the coordinated control layer and the local control layer.

The energy management layer has the energy management system, the SCADA server, a printer and a main switch. The energy management layer mainly realizes functions of power grid operation control, energy optimized management, wind power prediction, load prediction and the like to guarantee stable, reliable, low-carbon and economical operation of the power grid. The coordinated control layer distributes scheduling instructions issued by the energy management system by means of the coordinated controllers, thereby facilitating precise execution by the local control layer. The local control layer mainly includes devices, Protection devices (PD) of the devices and controllers thereof. A Terminal Controller (TC) of each device directly collects parameters of the device, transfers data upwards through the optical fibers, and receives control instructions issued by the energy management system by means of the coordinated controllers as well, which is the executing unit for a control strategy of the whole set energy management system.

The energy management system further needs various function modules to support operation scheduling. The energy management system includes analytical functions such as man-machine interface and man-machine interaction, data analysis, data prediction and decision-making scheduling. Man-machine interaction includes functions of network topology, real-time operation and data monitoring. Data analysis includes history service, statistical prediction and report analysis. Data prediction includes load prediction, wind power prediction and weather forecasting. Decision-making scheduling includes low-carbon scheduling, power supply management and load management. The low-carbon scheduling function proposed in the present application is integrated into the low-carbon scheduling module to optimally schedule offshore wind power and the gas generators. The low-carbon scheduling module is executed once every scheduling period, and the scheduling period can be 5 min or a scheduling period autonomously set by the operator. According to the scheduling decision-making result, offshore wind power and the gas generators execute the scheduling plan once every scheduling period to guarantee low-carbon operation of the microgrid.

Finally, it is to be noted that the above embodiments are merely used for explaining the technical solution of the present application rather than limiting the present application. Despite reference to the aforementioned embodiments to make a detailed description for the present application, it will be understood by those skilled in the art that they still can modify the technical scheme recorded by the aforementioned embodiments or make equivalent substitutions on part of technical features therein. Such modifications or substitutions do not deviate the nature of the technical solution from the spirit and scope of the technical solution embodied in the embodiments according to the present application.

What is claimed is:

1. A wind power accommodation oriented low-carbon operation scheduling method for offshore oil and gas platform energy system, the method comprising:

determining a maximum upward ramp flexibility demand and a maximum downward ramp flexibility demand caused by wind power in a target power grid system according to a predetermined scheduling period, and establishing a gas power generation and wind power synergetic ramp flexibility constraint according to an upward ramp ability, a downward ramp ability, the maximum upward ramp flexibility demand and the maximum downward ramp flexibility demand of a gas generator started in the target power grid system;

establishing a gas generating capacity and wind power capacity synergetic flexibility constraint according to a rated capacity of the started gas generator connected to each bus in the target power grid system;

establishing an operating characteristic constraint of a gas generator set according to an output power factor of the started gas generator set connected to each bus in the target power grid system, and establishing an operating characteristic constraint of a gas compressor according to operating parameters of each started gas compressor in the target power grid system;

establishing a grid-connected operating characteristic constraint of a wind generator according to a power factor of the wind generator connected to each bus in the target power grid system;

constructing a target linear planning model, wherein constraints of the target linear planning model comprise the gas power generation and wind power synergetic ramp flexibility constraint, the gas generating capacity and wind power capacity synergetic flexibility constraint, the operating characteristic constraint of the gas generator set, the operating characteristic constraint of the gas compressor and the grid-connected operating characteristic constraint of the wind generator; a target function of the target linear planning model is $$\min \sum_{i \in N^e} \sum_{\kappa \in \Omega_{E,i}^e} P_{i,\kappa}^E,$$

wherein $P_{i,\kappa}^E$ is an active power of the gas generator $\kappa$ connected to a bus i in the target power grid system, $N^e$ is a set of the buses in the target power grid system, and $\Omega_{E,i}^e$ is a set of the started gas generators connected to the bus i in the target power grid system; and solving the target linear planning model to obtain target powers of the started gas generators in the target power grid system, and performing scheduling according to the target powers, so that the powers of the started gas generators in the target power grid system reach the corresponding target powers.

2. The scheduling method according to claim 1, wherein the gas power generation and wind power synergetic ramp flexibility constraint is:

$$R^{UM} = \sum_{i \in N^e} \sum_{\kappa \in \Omega_{E,i}^e} R_{E,i,\kappa}^{UP} - (R_W^{UP} + R_D^{UP}) \geq 0$$

$$R^{DM} = \sum_{i \in N^e} \sum_{\kappa \in \Omega_{E,i}^e} R_{E,i,\kappa}^{DW} - (R_W^{DW} + R_D^{DW}) \geq 0$$

$$R_W^{UP} = R_W^{DW} = \frac{1}{I_{RE}} \sum_{i \in N_W^e} P_i^W,$$

wherein $R^{UM}$ and $R^{DM}$ are respectively upward and downward ramp flexibility indexes of the target power grid system, $N_W^e$ is a bus set capable of being connected to the wind generator in the target power grid system, $P_i^W$ is a power of the wind generator connected to the bus i in the target power grid system, $R_W^{UP}$ and $R_W^{DW}$ are respectively the maximum upward ramp flexibility demand and the maximum downward ramp flexibility demand caused by wind power, $I_{RE}$ is the scheduling period, $R_D^{UP}$ and $R_D^{DW}$ are respectively the upward ramp demand the downward ramp demand on the gas generator by a load of the target power grid system, and $R_{E,i,\kappa}^{UP}$ and $R_{E,i,\kappa}^{DW}$ are respectively the upward ramp ability and the downward ramp ability of the started gas generator at the bus i in the power grid system.

3. The scheduling method according to claim 1, wherein the gas generating capacity and wind power capacity synergetic flexibility constraint is:

$$\overline{P}_W = \sum_{i \in N_W^e} P_i^W$$

$$P^M = \sum_{i \in N^e} \sum_{\kappa \in \Omega_{E,i}^e} \overline{P}_{i,\kappa}^E - \left(\overline{P}_W + \sum_{i \in N^e} \sum_{\kappa \in \Omega_{E,i}^e} P_{i,\kappa}^E\right) \geq 0,$$

wherein $\overline{P}_W$ is a total capacity of wind power connected to the target power grid system, $P_i^W$ is a power of the wind generator connected to the bus i in the target power grid system, $N_W^e$ is a bus set of the wind generators capable of being connected in the target power grid system, $P_{i,\kappa}^E$ is an active power of the gas generator, $\overline{P}_{i,\kappa}^E$ is an upper limit of $P_{i,\kappa}^E$, formula is a rated capacity of the gas generator, and $\Omega_{E,i}^e$ is a set of the started gas generators connected to the bus i in the target power grid system.

4. The scheduling method according to claim 1, wherein the operating characteristic constraint of the gas generator set is:

$$\underline{P}_{i,\kappa}^E \leq P_{i,\kappa}^E \leq \overline{P}_{i,\kappa}^E, i \in N^e, \kappa \in \Omega_{E,i}^e$$

$$\underline{Q}_{i,\kappa}^E \leq Q_{i,\kappa}^E \leq \overline{Q}_{i,\kappa}^E, i \in N^e, \kappa \in \Omega_{E,i}^e$$

$$P_{i,\kappa}^E \tan(\cos^{-1}\underline{\lambda}_{i,\kappa}^E), i \in N^e, \kappa \in \Omega_{E,i}^e \leq Q_{i,\kappa}^E \leq P_{i,\kappa}^E \tan(\cos^{-1}\overline{\lambda}_{i,\kappa}^E)$$

wherein $P_{i,\kappa}^E$ and $Q_{i,\kappa}^E$ are respectively active and reactive powers of the gas generator, $\overline{P}_{i,\kappa}^E$ and $\overline{Q}_{i,\kappa}^E$ are respectively upper limits of $P_{i,\kappa}^E$ and $Q_{i,\kappa}^E$, $\overline{P}_{i,\kappa}^E$ and $\overline{Q}_{i,\kappa}^E$ are respectively rated capacities of the gas generator, $\underline{P}_{i,\kappa}^E$ is an upper limit of $P_{i,\kappa}^E$, $Q_{i,\kappa}^E$ is an upper limit of $Q_{i,\kappa}^E$, $\overline{\lambda}_{i,\kappa}^E$ and $\underline{\lambda}_{i,\kappa}^E$ are respectively upper and lower limits of output power factors of the gas generator connected to the bus i in the target power grid system, and $\Omega_{E,i}^e$ is the set of the gas generators connected to the bus i in the target power grid system; and the operating characteristic constraint of the gas compressor is:

$$f_{\kappa,k}(\gamma_\kappa, f) = A_{\kappa,k} f_\kappa^C + A'_{\kappa,k} \gamma_\kappa + A''_{\kappa,k} \leq 0, k = 4$$

$$\ln\Pi_{out,\kappa} - \ln\Pi_{in,\kappa} = 2\ln\gamma_\kappa, \kappa \in \Omega_C^g$$

$$\underline{\gamma}_\kappa \leq \gamma_\kappa \leq \overline{\gamma}_\kappa$$

$$\ln P_\kappa^C = \ln \frac{\alpha}{(\alpha-1)\varphi} + \frac{1}{2}\ln\Pi_{in,\kappa} + \ln f_\kappa^C + \ln A_\kappa, \kappa \in \Omega_C^g$$

$$\ln(A_\kappa + 1) = \frac{\alpha - 1}{\alpha} \ln\gamma_\kappa, \kappa \in \Omega_C^g$$

$$0 \leq P_\kappa^C \leq \overline{P}_\kappa^C, \kappa \in \Omega_C^g,$$

wherein $\Omega_C^g$ is the set of the gas compressors, $f_{\kappa,k}$ is the linear function of the $k^{th}$ boundary of the gas compressor $\kappa$, $A_{\kappa,k}$, $A'_{\kappa,k}$ and $A''_{\kappa,k}$ are linear parameters, $\gamma_\kappa$ is a compression ratio of the gas compressor $\kappa$, $\underline{\gamma}_\kappa$ and $\overline{\gamma}_\kappa$ are respectively upper and lower limits thereof, $\pi_{out,\kappa}$ and $\pi_{in,\kappa}$ are inlet and outlet pressures of the gas compressor, $\Pi_{out,\kappa} = (\pi_{out,\kappa})^2$, $\Pi_{in,\kappa} = (\pi_{in,\kappa})^2$ and $A_\kappa$ are intermediate variable, $P_\kappa^C$, $f_\kappa^C$, $\alpha$ and $\varphi$ are the active demand, a flow, the variable factor and the mechanical efficiency of the gas compressor $\kappa$, and $\overline{P}_\kappa^C$ is a rated power of the prime motor of the gas compressor.

5. The scheduling method according to claim 1, wherein the grid-connected operating characteristic constraint of the wind generator is:

$$\underline{P}_i^W \leq P_i^W \leq \overline{P}_i^W, i \in N_W^e$$

$$\underline{Q}_i^W \leq Q_i^W \leq \overline{Q}_i^W, i \in N_W^e$$

$$\underline{Q}_i^W = -P_i^W \tan(\cos^-(\lambda_i^W)), i \in N_W^e$$

$$\overline{Q}_i^W = P_i^W \tan(\cos^-(\lambda_i^W)), i \in N_W^e$$

wherein $\underline{P}_i^W$ and $\overline{P}_i^W$ are respectively upper and lower limits of an active power of the wind generator connected to the bus i in the target power grid system, $Q_i^W$ is a reactive power of the wind generator connected to the bus i in the target power grid system with a rated output, $\overline{Q}_i^W$ and $\underline{Q}_i^W$ are upper and lower limits of a reactive power of the wind generator connected to the bus i in the target power grid system, and a power factor range of wind power connected to the bus i in a microgrid is $-\lambda_i^W \sim \lambda_i^W$.

6. The scheduling method according to claim 1, wherein the constraints of the target linear planning model further comprise a power flow constraint of a power grid and an operation constraint of a gas network; and before constructing the target linear planning model, the method further comprises:

constructing the power flow constraint of the power grid according to power parameters of each bus in the target power grid system; and constructing the operation constraint of a gas network according to operating parameters of each natural gas pipeline in the target power grid system;

wherein the power flow constraint of the power grid is:

$$P_\ell^L + P_{\ell'}^L = r_\ell l_\ell,$$

$$Q_\ell^L + Q_{\ell'}^L = x_\ell l_\ell,$$

$$v_j = v_i - 2(r_\ell P_\ell^L + x_\ell Q_\ell^L) + (r_\ell^2 + x_\ell^2)l_\ell,$$

$$2(P_\ell^L)^2 + 2(Q_\ell^L)^2 + v_i^2 + l_\ell^2 = (v_i + l_\ell)^2,$$

$$Q_{\ell,i}^S = -v_i b_\ell/2,$$

$$Q_{\ell,j}^S = -v_j b_\ell/2,$$

$$\underline{U}_i^2 \le v_i \le \overline{U}_i^2, i \in N^e$$

$$(P_\ell^L)^2 + (Q_\ell^L)^2 \le \overline{S}_{ij}^L, \ell \in \Omega_L^e$$

$$\underline{l}_\ell \le l_\ell \le \overline{l}_\ell, \ell \in \Omega_{L,i}^e$$

$$\sum_{\kappa \in \Omega_{E,i}^e} P_{i,\kappa}^E + P_i^W = \sum_{\kappa \in \Omega_{D,i}^e} P_{i,\kappa}^D + \sum_{\ell \in \Omega_{L,i}^e} P_\ell^L$$

$$\sum_{\kappa \in \Omega_{E,i}^e} Q_{i,\kappa}^E + Q_i^W = \sum_{\kappa \in \Omega_{D,i}^e} Q_{i,\kappa}^D + \sum_{\ell \in \Omega_{L,i}^e} Q_\ell^L + \sum_{\ell \in \Omega_{L,i}^e} Q_{\ell,i}^S,$$

wherein $\Omega_L^e$ represents a power branch set, $\ell \in \Omega_L^e$, $P_\ell^L$ and $Q_\ell^L$ represent an active power and a reactive power of a flow direction from the bus i to the bus j in a branch l, $P_{\ell'}^L$ and $Q_{\ell'}^L$ represent an active power and a reactive power of a flow direction from the bus j to the bus i in the branch l, $r_i$ and $x_i$ represent resistance and inductive reactance of the branch, $v_i$ and $v_j$ represent squares of voltage magnitudes of the bus i and the bus j, $U_i$ represent a voltage amplitude of the bus i, $\overline{U}_i$ and $\underline{U}_i$ are a maximum value and a minimum value of $U_i$, $l_\ell$ represents a square of a current amplitude of the branch, $b_\ell$ represents equivalent charging capacitance of the branch, $Q_{\ell,i}^S$ and $Q_{\ell,j}^S$ respectively represent equivalent charging reactive powers connected to the bus i and the bus j, $\overline{S}_{ij}^L$ is a rated capacity of the power branch, $\Omega_{D,i}^e$ represents a load set of the bus i, $\Omega_{L,i}^e$ represents a set of branches connected to the bus i, $P_{i,\kappa}^E$ and $Q_{i,\kappa}^E$ respectively represent an active power and a reactive power of the gas generator, $P_i^W$ is a power of the wind generator connected to the bus i in the target power grid system, $Q_i^W$ is a reactive power of the wind generator the bus i in the target power grid system with the rated output, $P_{i,\kappa}^D$ represents an active power of the load connected to the bus i, and $Q_{i,\kappa}^D$ represents a reactive power of the load connected to the bus i; and the operation constraint of the gas network is:

$$2z_{\ell,3} - f_\ell = K_\ell \sqrt{B_\ell},$$

$$B_\ell = 2(z_{\ell,1} - z_{\ell,2}) - \Pi_m + \Pi_n,$$

$$x_\ell \underline{f}_\ell \le z_{\ell,3} \le x_\ell \overline{f}_\ell,$$

$$f_\ell + (x_\ell - 1)\overline{f}_\ell \le z_{\ell,3} \le f_\ell + (x_\ell - 1)\underline{f}_\ell,$$

$$x_\ell \underline{\Pi}_m \le z_{\ell,1} \le x_\ell \overline{\Pi}_m,$$

$$\Pi_m + (x_\ell - 1)\overline{\Pi}_m \le z_{\ell,1} \le \Pi_m + (x_\ell - 1)\underline{\Pi}_m,$$

$$x_\ell \underline{\Pi}_n \le z_{\ell,2} \le x_\ell \overline{\Pi}_n,$$

$$\Pi_n + (x_\ell - 1)\overline{\Pi}_n \le z_{\ell,2} \le \Pi_n + (x_\ell - 1)\underline{\Pi}_n,$$

$$\sum_{\kappa \in \Omega_{E,m}^g} f_{m,\kappa}^E + \sum_{\ell \in \Omega_{L,m}^g} f_\ell + \sum_{\kappa \in \Omega_{D,m}^g} f_{m,\kappa}^D = \sum_{\kappa \in \Omega_{S,m}^g} f_{m,\kappa}^S, m \in N^g,$$

wherein $z_i, 1$, $z_i, 2$, $z_i, 3$ and $x_i \in \{0,1\}$ are assistant variables, $K_\ell$ is a coefficient of a Weymouth equation of the natural gas pipeline, $f_\ell$ is an intermediate variable, $\Omega_L^g$ represents a set of the natural gas pipelines, $f_\ell$ is a gas flow rate of the pipeline, $\overline{f}_\ell$ and $\underline{f}_\ell$ represent a maximum value and a minimum value of $f_\ell$, $\pi_m$ and $\pi_n$ are respectively gas pressures at pipeline nodes m and n, and $\Pi_m = (\pi_m)^2$ and $\Pi_n = (\pi_n)^2$, $\overline{\Pi}_m$ and $\underline{\Pi}_m$ represent a maximum value and the minimum value of $\Pi_m$, $\overline{\Pi}_n$ and $\underline{\Pi}_n$ represent a maximum value and a minimum value of $\Pi_n$, $N^g$ is a pipeline node set, $\Omega_{E,m}^g$ is a set of the gas generators connected to the pipeline node m, $\Omega_{L,m}^g$ is the set of the gas generators connected to the pipeline node m, $\Omega_{D,m}^g$ is a set of gas loads connected to the pipeline node m, $\Omega_{S,m}^g$ is a set of gas sources connected to the pipeline node m, $f_{m,\kappa}^E$ is a gas flow rate consumed by the gas generator, $f_{m,\kappa}^D$ is a gas flow rate needed by the gas load, and $f_{m,\kappa}^S$ is a gas flow rate supplied by a gas source.

7. The scheduling method according to of claim 1, wherein the constructing the target linear planning model comprises:

performing linear processing on a non-linearized item in each constraint using a univariate piecewise linearized function, so as to obtain the target linear planning model.

8. A wind power accommodation oriented low-carbon operation scheduling system for offshore oil and gas platform energy system, operated on a terminal, the terminal comprising:

a processor and a computer readable storage medium in communication connection with the processor, the processor comprising:

a first constraint module, configured to determine a maximum upward ramp flexibility demand and a maximum downward ramp flexibility demand caused by wind power in a target power grid system according to a predetermined scheduling period, and to establish a gas power generation and wind power synergetic ramp flexibility constraint according to an upward ramp ability, a downward ramp ability, the maximum upward ramp flexibility demand and the maximum downward ramp flexibility demand of a gas generator started in the target power grid system;

a second constraint module, configured to establish a gas generating capacity and wind power capacity synergetic flexibility constraint according to a rated capacity of the started gas generator connected to each bus in the target power grid system;

a third constraint module, configured to establish an operating characteristic constraint of a gas generator set according to an output power factor of the started gas generator set connected to each bus in the target power grid system, and to establish an operating characteristic constraint of a gas compressor according to operating parameters of each started gas compressor in the target power grid system;

a fourth constraint module, configured to establish a grid-connected operating characteristic constraint of a wind generator according to a power factor of the wind generator connected to each bus in the target power grid system;

a model constructing module, configured to construct a target linear planning model, wherein constraints of the target linear planning model comprise the gas power generation and wind power synergetic ramp flexibility constraint, the gas generating capacity and wind power capacity synergetic flexibility constraint, the operating characteristic constraint of the gas generator set, the operating characteristic constraint of the gas compressor and the grid-connected operating characteristic constraint of the wind generator; a target function of the target linear planning model is $$\min \sum_{i \in N^e} \sum_{\kappa \in \Omega_{E,i}^e} P_{i,\kappa}^E,$$

wherein $P_{i,\kappa}^E$ is an active power of the gas generator $\kappa$ connected to a bus i in the target power grid system, $N^e$ is a set of the buses in the target power grid system, and $\Omega_{E,i}^e$ is a set of the started gas generators connected to the bus i in the target power grid system; and a model solving module, configured to solve the target linear planning model to obtain target powers of the started gas generators in the target power grid system, and to perform scheduling according to the target powers, so that the powers of the started gas generators in the target power grid system reach the corresponding target powers.

9. An energy management system for a microgrid of an offshore oil and gas field, comprising an energy management layer, a coordinated control layer, and a local control layer, the energy management layer comprises the wind power accommodation oriented low-carbon operation scheduling system for offshore oil and gas platform energy system according to claim 8, the energy management layer connects to the microgrid in the local control layer through a coordinated controller and an optical fiber switch in the coordinated control layer, to perform steps of:

determining the maximum upward ramp flexibility demand and the maximum downward ramp flexibility demand caused by wind power in a target power grid system according to a predetermined scheduling period, and establishing a gas power generation and wind power synergetic ramp flexibility constraint according to an upward ramp ability, a downward ramp ability, the maximum upward ramp flexibility demand and the maximum downward ramp flexibility demand of a gas generator started in the target power grid system;

establishing a gas generating capacity and wind power capacity synergetic flexibility constraint according to a rated capacity of the started gas generator connected to each bus in the target power grid system;

establishing an operating characteristic constraint of a gas generator set according to an output power factor of the started gas generator set connected to each bus in the target power grid system, and establishing an operating characteristic constraint of a gas compressor according to operating parameters of each started gas compressor in the target power grid system;

establishing a grid-connected operating characteristic constraint of a wind generator according to a power factor of the wind generator connected to each bus in the target power grid system;

constructing a target linear planning model, wherein constraints of the target linear planning model comprise the gas power generation and wind power synergetic ramp flexibility constraint, the gas generating capacity and wind power capacity synergetic flexibility constraint, the operating characteristic constraint of the gas generator set, the operating characteristic constraint of the gas compressor and the grid-connected operating characteristic constraint of the wind generator; a target function of the target linear planning model is $$\min \sum_{i \in N^e} \sum_{\kappa \in \Omega_{E,i}^e} P_{i,\kappa}^E,$$

wherein $P_{i,\kappa}^E$ is an active power of the gas generator $\kappa$ connected to a bus i in the target power grid system, $N^e$ is a set of the buses in the target power grid system, and $\Omega_{E,i}^e$ is a set of the started gas generators connected to the bus i in the target power grid system; and solving the target linear planning model to obtain target powers of the started gas generators in the target power grid system, and performing scheduling according to the target powers, so that the powers of the started gas generators in the target power grid system reach the corresponding target powers.

* * * * *